(12) United States Patent
Takashima

(10) Patent No.: US 7,760,232 B2
(45) Date of Patent: Jul. 20, 2010

(54) SLAVE DEVICE AND COMMUNICATION SETTING METHOD

(75) Inventor: Toru Takashima, Ehime (JP)

(73) Assignee: Panasonic Corporation, Osaka (JP)

( * ) Notice: Subject to any disclaimer, the term of this patent is extended or adjusted under 35 U.S.C. 154(b) by 864 days.

(21) Appl. No.: 10/533,765

(22) PCT Filed: Jun. 23, 2004

(86) PCT No.: PCT/JP2004/009214
§ 371 (c)(1),
(2), (4) Date: May 4, 2005

(87) PCT Pub. No.: WO2005/001701
PCT Pub. Date: Jan. 6, 2005

(65) Prior Publication Data
US 2006/0109349 A1 May 25, 2006

(30) Foreign Application Priority Data
Jun. 27, 2003 (JP) .............................. 2003-185430

(51) Int. Cl.
*H04N 5/225* (2006.01)
(52) U.S. Cl. .................................................. 348/207.1
(58) Field of Classification Search .............. 348/207.1, 348/207.11, 211.3, 143, 207.99
See application file for complete search history.

(56) References Cited

U.S. PATENT DOCUMENTS 6,897,891 B2* 5/2005 Itsukaichi .................. 348/14.1
7,260,357 B2* 8/2007 Hulvey ...................... 455/41.2
7,315,323 B2* 1/2008 Ito ........................... 348/207.1
7,432,948 B2* 10/2008 Watanabe et al. .......... 348/14.02
2002/0126212 A1 9/2002 Yoneda
2002/0186317 A1* 12/2002 Kayanuma .................. 348/373

(Continued)

FOREIGN PATENT DOCUMENTS

JP 2001-067300 A 3/2001

(Continued)

OTHER PUBLICATIONS

International Search Report for PCT/JP2004/009214, dated Oct. 12, 2004.

*Primary Examiner*—Lin Ye
*Assistant Examiner*—Amy Hsu
(74) *Attorney, Agent, or Firm*—RatnerPrestia

(57) ABSTRACT

A digital camera capable of communicating with an external device through a predetermined communication bus and having a plurality of communication modes of diverse kinds includes a system control section and a USB control section which serve respectively as a judging device for transmitting a notification code for notifying a presently set-up communication mode, and then judging whether a command in response to the notification code is received from the master device within a predetermined time or not; and a communication controlling device for performing control on the basis of a judgment result of the judging device in such a manner that when a command in response to the notification code is received from a master device within the predetermined time, a state permitting communication with the master device is established in correspondence to the command, and when the command is not received within the predetermined time, connection to the master device is electrically released temporarily and then the connection is restored.

19 Claims, 9 Drawing Sheets

U.S. PATENT DOCUMENTS

| | | | |
|---|---|---|---|
| 2004/0109062 A1* | 6/2004 | Yamaya | 348/207.1 |
| 2005/0253930 A1* | 11/2005 | Endo et al. | 348/207.1 |
| 2006/0279642 A1 | 12/2006 | Yoneda | |

FOREIGN PATENT DOCUMENTS

| | | |
|---|---|---|
| JP | 2001-290753 A | 10/2001 |
| JP | 2002-244775 A | 8/2002 |
| JP | 2002-271721 A | 9/2002 |
| JP | 2002-305677 A | 10/2002 |
| JP | 2002-359810 A | 12/2002 |
| JP | 2005-511094 | 2/2010 |

* cited by examiner

SLAVE DEVICE AND COMMUNICATION SETTING METHOD

THIS APPLICATION IS A U.S. NATIONAL PHASE APPLICATION OF PCT INTERNATIONAL APPLICATION PCT/JP2004/009214.

TECHNICAL FIELD

The present invention relates to a slave apparatus, a communication setting method, and the like applicable to a digital camera or the like, capable of performing USB connection in a mass storage class and an imaging class.

BACKGROUND ART

FIG. 7 shows the configuration of an image data transfer system comprising a digital camera and external devices according to the prior art (see JP-A-2002-271721).

The image data transfer system 700 comprises a digital camera 710, as well as a personal computer 720, a printer A 730, and a printer B 740 serving as external devices. The printer A 730 and the printer B 740 have a processing capability of acquiring image data from the digital camera 710 and then printing the image. In the image data transfer system 700, each of the digital camera 710, the personal computer 720, the printer A 730, and the printer B 740 has an interface which supports a USB (universal serial bus). The digital camera 710 is USB-connected to the external devices respectively through USB cables 750a-750c.

As for the external devices connected to the digital camera 710, the printer A 730 or the printer B 740 can acquire and directly print out image data which has been image-acquired and recorded in the inside of the digital camera 710. The personal computer 720 can delete the image data stored in the digital camera 710. As such, various kinds of processing for the image data stored in the digital camera 710 can be performed under the control of the external devices.

Meanwhile, devices capable of USB connection can have a plurality of communication modes. When communication partners have the same communication mode, their communication is achieved so that data transfer or the like can be performed.

In the image data transfer system 700, the printer A 730 is a mass-storage class supporting device which recognizes the digital camera 710 as a mass storage device, and has a communication mode corresponding to the mass storage class. The printer B 740 is an imaging class supporting device which recognizes the digital camera as an imaging device, and has a communication mode corresponding to the imaging class. The personal computer 720 has communication modes corresponding to both classes described above. The personal computer 720 can recognize the digital camera as a mass storage device as well as an imaging device, and has two communication modes corresponding to the mass storage class and the imaging class.

These external devices try to perform communication necessary for image data transfer, on the assumption that a device serving as the partner in the USB connection has the same communication mode as their own communication mode. Nevertheless, communication is not achieved when the partner device does not have the same communication mode.

In the use of such external devices, a user of the digital camera 710 selects in advance any communication mode from the group consisting of the mass storage class and the imaging class in correspondence to the class of an external device to be connected, so that the set up is achieved such that the communication mode becomes the same as that of the external device.

This allows the digital camera to support external devices in both cases that an external device like the printer A 730 recognizes the digital camera as a mass storage device and that an external device recognizes the digital camera as an imaging device although not shown in the figure. This allows the digital camera 710 to be connected to various external devices.

Nevertheless, in order to select a communication mode, the user needs to understand the communication modes in both of the external device and the digital camera 710, and find what kind of a communication mode is used in the present system, so as to select and set an appropriate communication mode of the digital camera 710. This has been a notably annoying work for users, and has caused inconvenience especially to users unfamiliar with the operation of the digital camera 710.

DISCLOSURE OF THE INVENTION

The present invention has been devised with considering the above-mentioned problems. A purpose of the present invention is to provide a slave apparatus and the like applicable to a digital camera or the like, and capable of setting up the communication mode automatically in correspondence to the type of an external device to be connected, without a user's complicated operation.

A first aspect of the present invention is a slave apparatus capable of communicating with a master device through a predetermined communication bus and having a plurality of communication modes of divers kinds, said slave apparatus comprising:

judging means of transmitting to said master device a notification code of notifying a presently set-up own communication mode, and then judging whether a command in response to said notification code is received from said master device within a predetermined time or not; and communication controlling means of performing control on the basis of a judgment result of said judging means in such a manner that when a command in response to said notification code is received from said master device within the predetermined time, a state permitting communication with said master device is established in correspondence to the command, and that when said command is not received within said predetermined time, connection to said master device is electrically released temporarily and then said connection is restored; wherein by the time when said slave apparatus and said master device resume communication as a result of said restoration of connection, said communication controlling means selects one from a plurality of said communication modes so that its own communication mode is changed into one different from that used immediately before said release.

A second aspect of the present invention is a slave apparatus capable of communicating with a master device through a predetermined communication bus and having a plurality of communication modes of diverse kinds, said slave apparatus comprising:

judging means of transmitting to said master device a notification code of notifying a presently set-up own communication mode, and then judging whether a command received from said master device in response to said notification code corresponds to said presently set-up own communication mode or not; and communication controlling means of performing control on the basis of a judgment result of said judging means in such a manner that when said command corresponds to the presently set-up communication mode, a state permitting communication with said master device is established in correspondence to the command, and that when said command does not correspond to the presently set-up communication mode, connection to said master device is electrically released temporarily and then said connection is restored; wherein by the time when said slave apparatus and said master device resume communication as a result of said restoration of connection, said communication controlling means selects one from a plurality of said communication modes so that its own communication mode is changed into one different from that used immediately before said release.

A third aspect of the present invention is a slave apparatus capable of communicating with a master device through a predetermined communication bus and having a plurality of communication modes of diverse kinds, said slave apparatus comprising:

communication mode identifying means of transmitting to said master device a notification code of notifying a presently set-up own communication mode, and then identifying the kind of communication mode corresponding to a command received from said master device in response to said notification code; and communication controlling means of performing control such as to change its own communication mode in correspondence to an identification result of said communication mode identifying means and then establish a state permitting communication with said master device.

A fourth aspect of the present invention is the slave apparatus according to any one of the first to the third aspects of the present invention, wherein said predetermined communication bus is a USB (universal serial bus) type.

A fifth aspect of the present invention is the slave apparatus according to the fourth aspect of the present invention, wherein said communication controlling means performs said release by pulling up or pulling down a voltage applied to a D$^+$ or a D$^-$ line of said USB.

A sixth aspect of the present invention is the slave apparatus according to the fourth aspect of the present invention, wherein said communication controlling means performs said release by turning OFF a $V_{bus}$ line through with a voltage from said hose device is supplied in said USB.

A seventh aspect of the present invention is the slave apparatus according to any one of the first to the third aspects of the present invention, wherein a plurality of said communication modes include at least two modes selected from a mode corresponding to an imaging class, a mode corresponding to a mass storage class, a mode corresponding to a customized class, and a mode corresponding to a streaming class.

An eighth aspect of the present invention is the slave apparatus according to the seventh aspect of the present invention, wherein said mode corresponding to a mass storage class among a plurality of said communication modes is set up in itself as an initial state.

A ninth aspect of the present invention is the slave apparatus according to the fourth aspect of the present invention, wherein said USB is embodied as a wire USB cable.

A tenth aspect of the present invention is the slave apparatus according to the fourth aspect of the present invention, wherein said USB is embodied as a wireless circuit.

An eleventh aspect of the present invention is the slave apparatus according to any one of the first to the third aspects of the present invention, comprising displaying means of displaying information on a communication state including information concerning a communication mode presently set up in itself.

A twelfth aspect of the present invention is the digital camera comprising a slave apparatus according to any one of the first to the third aspect of the present invention and capable of transmitting recorded-by-oneself data recorded by itself to said master device through said communication.

A thirteenth aspect of the present invention is a communication setting method of setting a communication mode in a slave device capable of communicating with a master device through a predetermined communication bus and having a plurality of communication modes of diverse kinds, said method comprising:

a judging step of transmitting to said master device a notification code of notifying a communication mode presently set up in said slave device, and then judging whether a command in response to said notification code is received from said master device within a predetermined time or not; and a communication controlling step of performing control on the basis of a judgment result of said judging step in such a manner that when a command in response to said notification code is received from said master device within the predetermined time, said slave device is set into a state permitting communication with said master device in correspondence to the command, and that when said command is not received within said predetermined time, said slave device electrically releases connection to said master device temporarily and then restores said connection; wherein in said communication controlling step, by the time when said slave device and said master device resume communication as a result of said restoration of connection, a communication mode is selected from a plurality of said communication modes so that its own communication mode is changed into one different from that used immediately before said release.

A fourteenth aspect of the present invention is a communication setting method of setting a communication mode in a slave apparatus capable of communicating with a master device through a predetermined communication bus and having a plurality of communication modes of diverse kinds, said method comprising:

a judging step of transmitting to said master device a notification code of notifying a communication mode presently setup in said slave apparatus, and then judging whether a command received from said master device in response to said notification code corresponds to said communication mode presently set up in said slave apparatus or not; and a communication controlling step of performing control on the basis of a judgment result of said judging step in such a manner that when said command corresponds to the communication mode presently set up in said slave apparatus, a state permitting communication between said slave apparatus and said master device is established in correspondence to the command, and that when said command does not correspond to the communication mode presently set up in said slave apparatus, said slave apparatus electrically releases connection to said master device temporarily and then restores said connection; wherein in said communication controlling step, by the time when said slave apparatus and said master device resume communication as a result of said restoration of connection, a communication mode is selected from a plurality of said communication modes so that its own communication mode is changed into one different from that used immediately before said release.

A fifteenth aspect of the present invention is a communication setting method of setting a communication mode in a slave apparatus capable of communicating with a master device through a predetermined communication bus and having a plurality of communication modes of diverse kinds, said method comprising:

a communication mode identifying step of transmitting to said master device a notification code of notifying a communication mode presently set up in said slave apparatus, and then identifying the kind of communication mode corresponding to a command received from said master device in response to said notification code; and a communication controlling step of performing control such as to change the communication mode of said slave apparatus in correspondence to an identification result of said communication mode identifying step and then establish a state permitting communication with said master device.

A sixteenth aspect of the invention is a program of causing a computer to serve, in a slave apparatus according to the first aspect of the present invention, as: judging means of transmitting to said master device a notification code of notifying a presently set-up own communication mode, and then judging whether a command in response to said notification code is received from said master device within a predetermined time or not; and communication controlling means of performing control on the basis of a judgment result of said judging means in such a manner that when a command in response to said notification code is received from said mater device within the predetermined time, a state permitting communication with said master device is established in correspondence to the command, and that when said command is not received within said predetermined time, connection to said master device is electrically released temporarily and then said connection is restored.

A seventeenth aspect of the present invention is a program of causing a computer to serve, in a slave apparatus according to the second aspect of the present invention, as: judging means of transmitting to said master device a notification code of notifying a presently set-up own communication mode, and then judging whether a command received from said master device in response to said notification code corresponds to said presently set-up own communication mode or not; and communication controlling means of performing control on the basis of a judgment result of said judging means in such a manner that when said command corresponds to the presently set-up communication mode, a state permitting communication with said master device is established in correspondence to the command, and that when said command does not correspond to the presently set-up communication mode, connection to said master device is electrically released temporarily and then said connection is restored.

An eighteenth aspect of the present invention is a program of causing a computer to serve, in a slave apparatus according to the third aspect of the present invention, as: communication mode identifying means of transmitting to said master device a notification code of notifying a presently set-up own communication mode, and then identifying the kind of communication mode corresponding to a command received from said master device in response to said notification code; and communication controlling means of performing control such as to change its own communication mode in correspondence to an identification result of said communication mode identifying means and then establish a state permitting communication with said master device.

A nineteenth aspect of the present invention is a computer-processable recording medium carrying a program according to any one of the sixteenth to the nineteenth aspects of the present invention.

A twentieth aspect of the present invention is an information processing apparatus comprising a slave apparatus according to any one of the first to the third aspects of the present invention and

DESCRIPTION OF REFERENCE NUMERALS

Figure 1:
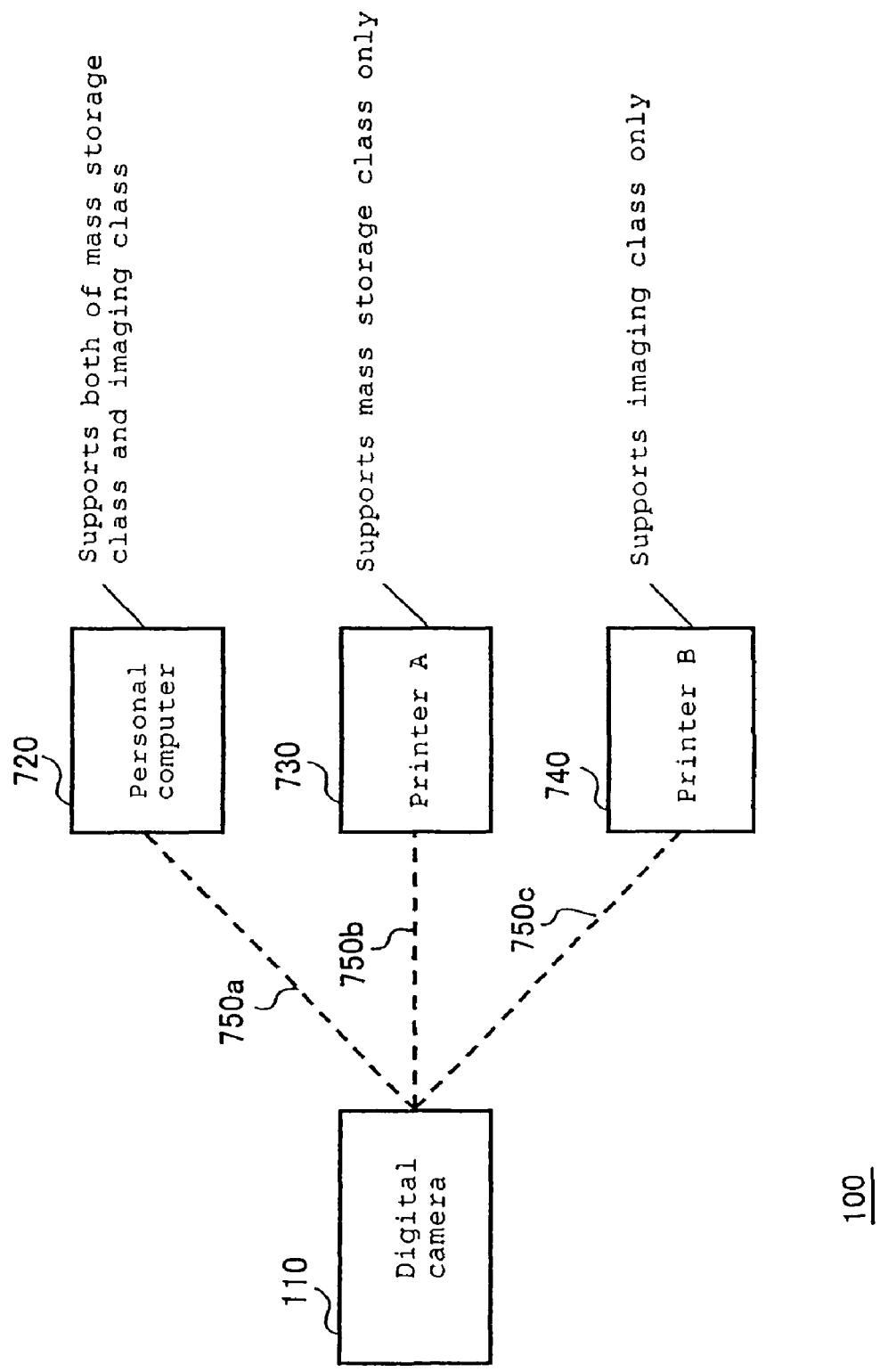
FIG. 1 is a configuration diagram of an image transfer system comprising a digital camera 110 and external devices according to Embodiment 1 of the present invention.

110 Digital camera
111 Imaging means
112 Image processing means
113 Memory card
114 Liquid crystal display monitor
115 System controlling means
116 Operating means
117 Communication connector
118 USB control section
200 USB cable
210 $V_{BUS}$ line
220 $D^+$ line
230 $D^-$ Line
240 GND line
300 External device

BEST MODE FOR CARRYING OUT THE INVENTION

Embodiments of the present invention are described below with reference to the drawings.

Embodiment 1

FIG. 1 is a configuration diagram of an image data transfer system comprising a digital camera and external devices according to Embodiment 1 of the present invention.

In the image data transfer system 100, the configuration other than a digital camera 110 is the same as the prior art example. That is, a printer A 730 and a printer B 740 serving as external devices have a processing capability of acquiring image data from the digital camera 110 and then printing the image. In the image data transfer system 100, each of the digital camera 110, the personal computer 720, the printer A 730, and the printer B 740 has an interface which supports USB (universal serial bus). The digital camera 110 is USB-connected to the external devices respectively through USB cables 750a-750c.

Similarly to the prior art example, the printer A 730 is a mass-storage class supporting device which recognizes the digital camera 110 as a mass storage device, and has a communication mode corresponding to the mass storage class. The printer B 740 is an imaging class supporting device which recognizes the digital camera as an imaging device, and has a communication mode corresponding to the imaging class. The personal computer 720 has communication modes corresponding to both classes described above. The personal computer 720 can recognize the digital camera as an imaging device as well as a mass storage device, and has two communication modes corresponding to the mass storage class and the imaging class.

Figure 2:
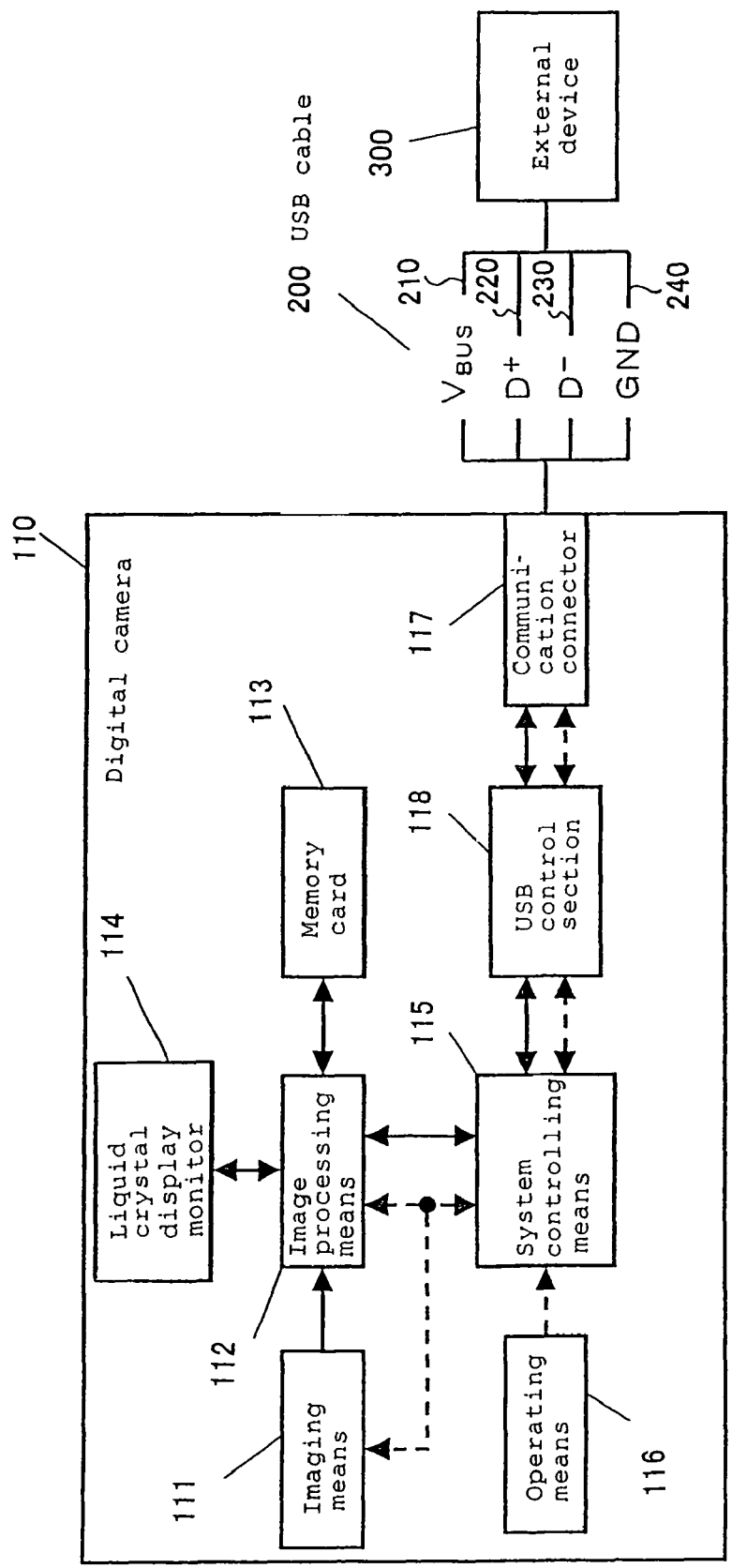
FIG. 2 is a block diagram showing the configuration of a digital camera 110 and its vicinity according to Embodiment 1 of the present invention.

Next, FIG. 2 is a block diagram showing the configuration of a digital camera 110 and its vicinity according to Embodiment 1 of the present invention. As shown in FIG. 2, in the digital camera 110, imaging means 111 is means of imaging an object and thereby acquiring image data. Image processing means 112 is means of processing the image data acquired by the imaging means 111, into data capable of being displayed and stored. A memory card 113 is means of storing the image data. A liquid crystal display monitor 114 is means of displaying the contents of the acquired image data as well as the operation and function of the digital camera 110. System controlling means 115 is means of controlling the image processing means 112, and operates on the basis of an input from operating means 116 of receiving a user operation.

A communication connector 117 is a connector of connecting a USB cable 200. A USB control section 118 is means of controlling the connection state and the communication through the USB cable, and is controlled by the system controlling means 115. In practice, the USB control section 118 is embodied in a dedicated semiconductor chip or the like.

The USB cable 200 corresponds to the USB cables 750a-750c of FIG. 1, and is connected to an external device 300 corresponding to the personal computer 720, the printer A 730, and the printer B 740 of FIG. 1. The USB cable 200 comprises four signal lines which consists of: a $V_{BUS}$ line 210 through which a voltage is supplied from the external device 300; a $D^+$ line 220 and a $D^-$ line 230 through which data is transferred between the external device 300 and the digital camera 110; and a GND line 240 through which a reference potential is provided. As schematically shown in FIG. 2, the USB control section 118 can control the connection of each of the four lines constituting the USB cable 200.

Figure 3:
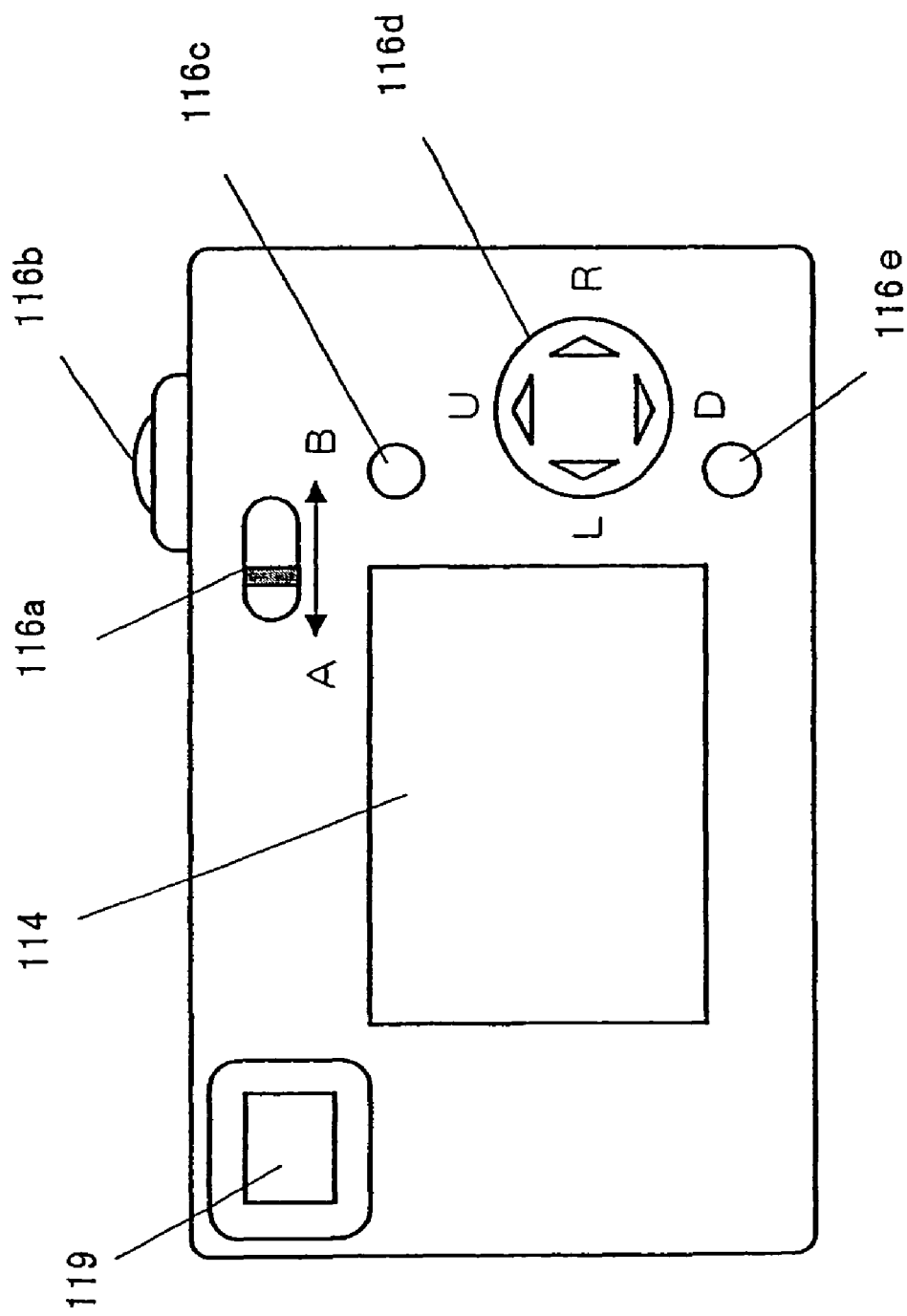
FIG. 3 is a block diagram showing a rear view of a digital camera 110 according to Embodiment 1 of the present invention.

Next, FIG. 3 is a block diagram showing a rear view of a digital camera 110 according to Embodiment 1 of the present invention. As shown in FIG. 3, when a power switch 116a serving as a part of the operating means 116 is turned to an arrow A side in the figure, the power supply of the digital camera 110 goes ON. When the switch is turned to an arrow B side, the power supply of the digital camera goes OFF. The operating means 116 further comprises: a shutter button 116b; a decision button 116c; a cursor key 116d of operating in the four directions of U (up), R (right), L (left), and D (down); and a menu button 116e for menu selection. In addition, the rear surface is provided with: a liquid crystal display monitor 114 exposed therein; and a finder 119 used during image acquisition. However, portions concerning the imaging function of the digital camera 110 are the same as those of known art, and hence their detailed description is omitted.

In the above-mentioned configuration, the digital camera 110 corresponds to a device carrying a slave device of the present invention. The external device 300 (the personal computer 720, the printer A 730, or the printer B 740) corresponds to a master apparatus of the present invention. The system controlling means 115 and the USB control section 118 correspond to judging means and communication controlling means of the present invention. The liquid crystal display monitor 114 corresponds to displaying means of the present invention.

The operation of the digital camera 110 according to Embodiment 1 of the present invention having the above configuration is described below with reference to the flow chart of FIG. 4 as well as the schematic operation diagram of FIG. 5 for a liquid crystal display monitor 114. At the same time, described is an embodiment of a communication setting method of the present invention.

(1) First, the operation is described below for the case that the digital camera 110 is connected to the personal computer 720 or the printer A 730 serving as an external device 300 of mass storage class.

A user selects an automatic mode using the cursor key 116d, the menu button 116e, and the decision button 116c with reference to a selection screen on the liquid crystal display monitor 114 shown in FIG. 5(a) (S1). Then, the user physically connects the digital camera 110 to the communication connector of the personal computer 720 or the printer A 730 through the USB cable 200.

Once the connection is established through the USB cable 200, negotiation starts for performing communication in the mass storage class between the digital camera 110 and the external device 300 (in this case, the personal computer 720 or the printer A 730) (S2). Specifically, the USB control section 118 pulls up the voltage of the $D^+$ line in the USB cable shown in FIG. 2, so as to electrically connect the digital camera 110 to the external device 300.

Then, the external device 300 transmits to the digital camera 110a command (standard request) for starting negotiation. In response to the standard request, the digital camera 110 transmits to the external device 300 a notification code of notifying that oneself (the digital camera 110) is amass storage device (S3).

In response to the notification code, the external device 300 transmits a command of mass storage class. The digital camera 110 receives this command (Yes in S4), and then continues the communication in the mass storage class (S10). At that time, on the basis of the control of the USB control section 118, the system controlling means 115 displays a screen shown in FIG. 5(c) onto the liquid crystal display monitor 114, and thereby notifies the user of the communication state of the digital camera 110. After that, once the communication is established between the digital camera 110 and the personal computer 720 or the printer A 730, the personal computer 720 or the printer A 730 can process image data in the memory card 113 in the digital camera 110.

(2) Next, the operation is described below for the case that the digital camera 110 is connected to the printer B 740 serving as an external device 300 of imaging class.

Similarly to case (1), the digital camera 110 and the printer B 740 are connected through the USB cable 200. Then, an automatic mode is selected on the selection screen shown in FIG. 5(*a*) (S1). As a result, negotiation starts for performing communication in the mass storage class with the printer B 740 (S2)

Then, the printer B 740 transmits to the digital camera 110 a command (standard request) for starting negotiation. In response to the standard request, the digital camera 110 transmits to the printer B 740 a communication code of notifying that oneself (the digital camera 110) is a mass storage device (S3).

Nevertheless, the printer B 740 is a device of imaging class. Thus, (a) even when receiving the communication code from the digital camera 110 serving as a device of mass storage class, the printer cannot distinguish the code and hence cannot transmit a corresponding command. Otherwise, depending on the type of the printer B 740, (b) the printer transmits a command of imaging class regardless of the kind of the communication code from the digital camera 110.

Neither case (a) nor (b) described above can the digital camera 110 receive any command of mass storage class corresponding to its own communication mode (No in S4).

At that time, the digital camera 110 terminates the communication in the mass storage class. Specifically, in case (a), when confirming that no command is received after a predetermined time duration, the USB control section 118 pulls down the voltage of the D$^+$ line 220 in the USB cable shown in FIG. 2, and thereby temporarily releases the electric connection between the digital camera 110 and the external device 300 so as to terminate the communication in the mass storage class (S5). This time duration may be measured by a dedicated timer provided in the configuration although not shown in the figure. Alternatively, a clock in the system controlling means 115 of the digital camera 110 may be used. The predetermined time duration is preferably set to be at least 5 seconds or the like.

In case (b) described above, after the USB control section 118 receives the command of imaging class from the printer B 740 and confirms that the command is not of mass storage class, the USB control section pulls down the voltage of the D$^+$ line in the USB cable shown in FIG. 2, and thereby temporarily releases the electric connection between the digital camera 110 and the external device 300 so as to terminate the communication in the mass storage class (S5).

This confirmation is carried out by referring to a packet of the command in each class. More specifically, a configuration such as a packet size and a head part is referred to. For example, a packet of mass storage class (in the case of Bulk-Only Transfer) has a size of 31 bytes, and has an identifier "USBC" in the head part. Thus, the USB control section 118 checks the presence or absence of this identification information. In contrast, a packet of imaging class (in the case of PTP: Picture Transfer Protocol) has a variable size, while its head part stores packet size information.

Then, in the digital camera 110, the USB control section 118 pulls up again the voltage of the D$^+$ line 220 in the USB cable 200, and thereby resumes the negotiation (S6).

The negotiation in S6 is the same as the negotiation operation in step S2. However, as a part of the negotiation, the USB control section 118 of the digital camera 110 switches the communication mode, and then transmits to the printer B 740 a new communication code of notifying that the digital camera 110 itself is an imaging device (S7). At that time, the switching of the communication mode is sufficient as long as the switching is carried out after the electric connection is temporarily released between the digital camera 110 and the external device 300 and before the transmission of a new communication code is started. That is, the switching may be carried out before the USB control section 118 pulls up again the voltage of the D$^+$ line in the USB cable 200, or alternatively immediately after the pull-up. However, in order to ensure the communication, the switching of the communication mode is preferably completed before the pull-up.

Then, in response to this new communication code, the printer B 740 transmits a command of imaging class. The digital camera 110 receives this command (Yes in S8), and then continues the communication in the imaging class (S9). At that time, the digital camera displays a screen shown in FIG. 5(*d*) onto the liquid crystal display monitor 114, and thereby notifies the user of the communication state of the digital camera 110. After that, once the communication is established between the digital camera 110 and the printer B 740, the printer B 740 can process image data in the memory card 113 in the digital camera 110.

The judgment whether the command has been received or not in S8 is carried out by measuring a predetermined time duration similarly to the case of S4. When a command of imaging class is received, the procedure automatically goes to S9 so that a state of communication continuation is established. When no command is received, a screen shown in FIG. 5(*e*) is displayed on the liquid crystal display monitor 114 so as to notify the user that communication is not established between the devices (S11). Such a situation can occur when the USB cable 200 is not appropriately inserted into the communication connector 117 or the like so that physical connection is not secured.

As such, according to a digital camera of the present embodiment, even in case that external devices have communication modes corresponding to two different classes, the digital camera automatically selects an appropriate communication mode, and thereby establishes a communication state. This avoids a user's complicated operation.

In the above-mentioned description, the connection has been electrically released by pulling up and pulling down the voltage applied to the D$^+$ line 220 of the USB cable 200. Alternatively, the release may be carried out by pulling up and pulling down the voltage applied to the D$^-$ line 230 of the USB cable 200. Further, the release may be carried out by ON-OFF switching the supply of a voltage through the V$_{BUS}$ line 210 of the USB cable 200. Each of these operations is equivalent to physical disconnection of the USB cable 200, and hence ensures the reset operation by the external device 300.

Further, in the above-mentioned description, in the automatic mode, a communication code of notifying that the device is of mass storage class has been transmitted first (S3), and a communication code of notifying that the device is of imaging class has been transmitted later (S7). These communication codes may be in reverse order. However, with considering the following reasons, the order used in the above-mentioned embodiment is preferred. That is, a majority of personal computers in the market support the mass storage class, while for the purpose of the storage or the like of image data, a special connection is made to a personal connection. Further, depending on the type of an external device 300, for example, in a part of personal computers, when a device of imaging class is connected, subsequent processing is suspended until a suitable driver is found. These are the reasons.

In the above-mentioned description, two kinds of communication modes, that is, the communication mode of mass storage class and the communication mode of imaging class have been used. However, the communication modes may be three or more. For example, communication modes may also be included that correspond to a customized class and a streaming class. Namely, it is sufficient that at least two kinds of communication modes are included that are selected from the above-mentioned communication modes.

Figure 8:
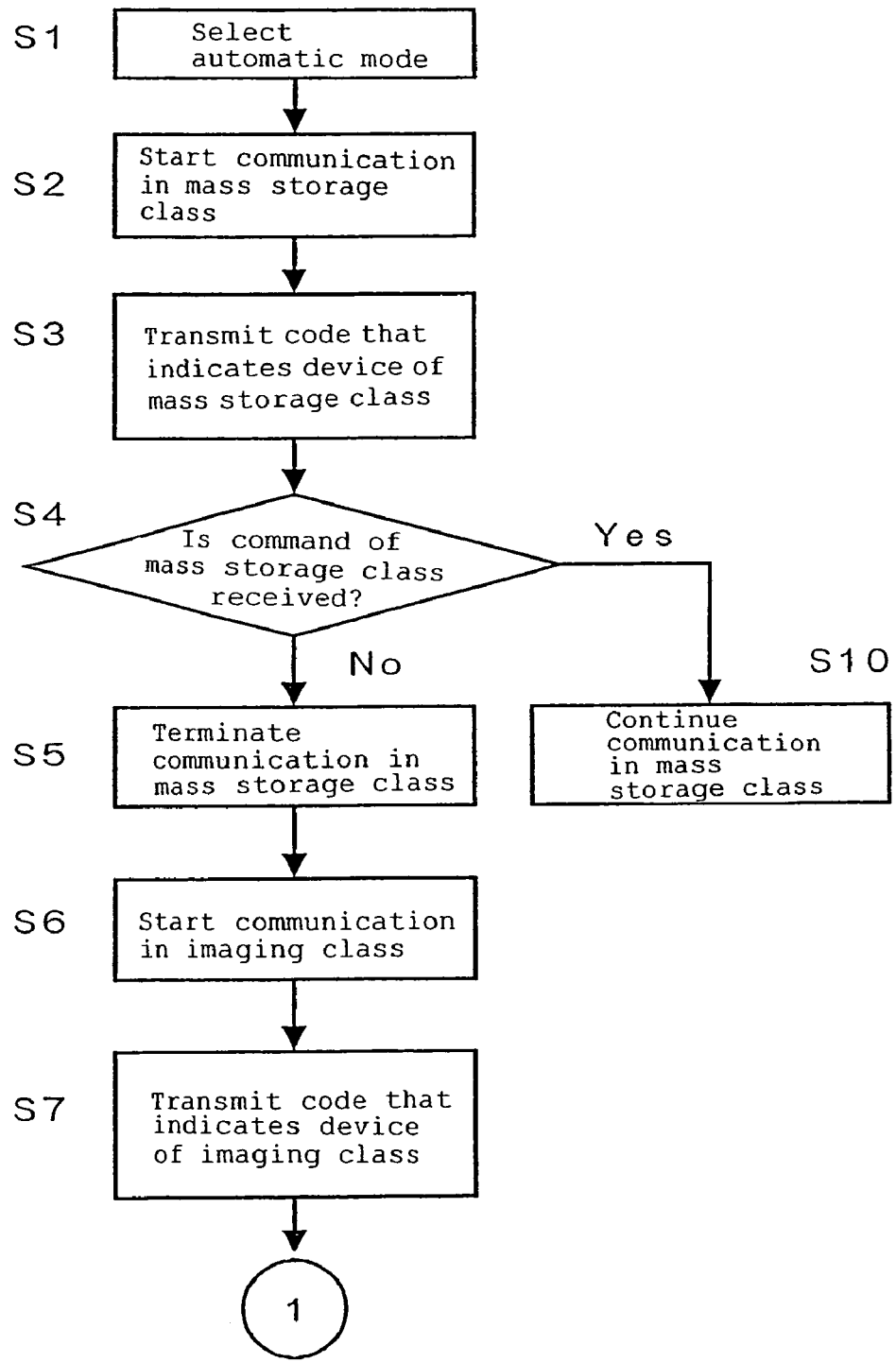
FIG. 8 is a diagram showing a flow chart of operation of a digital camera 110 according to Embodiment 1 of the present invention.
Figure 9:
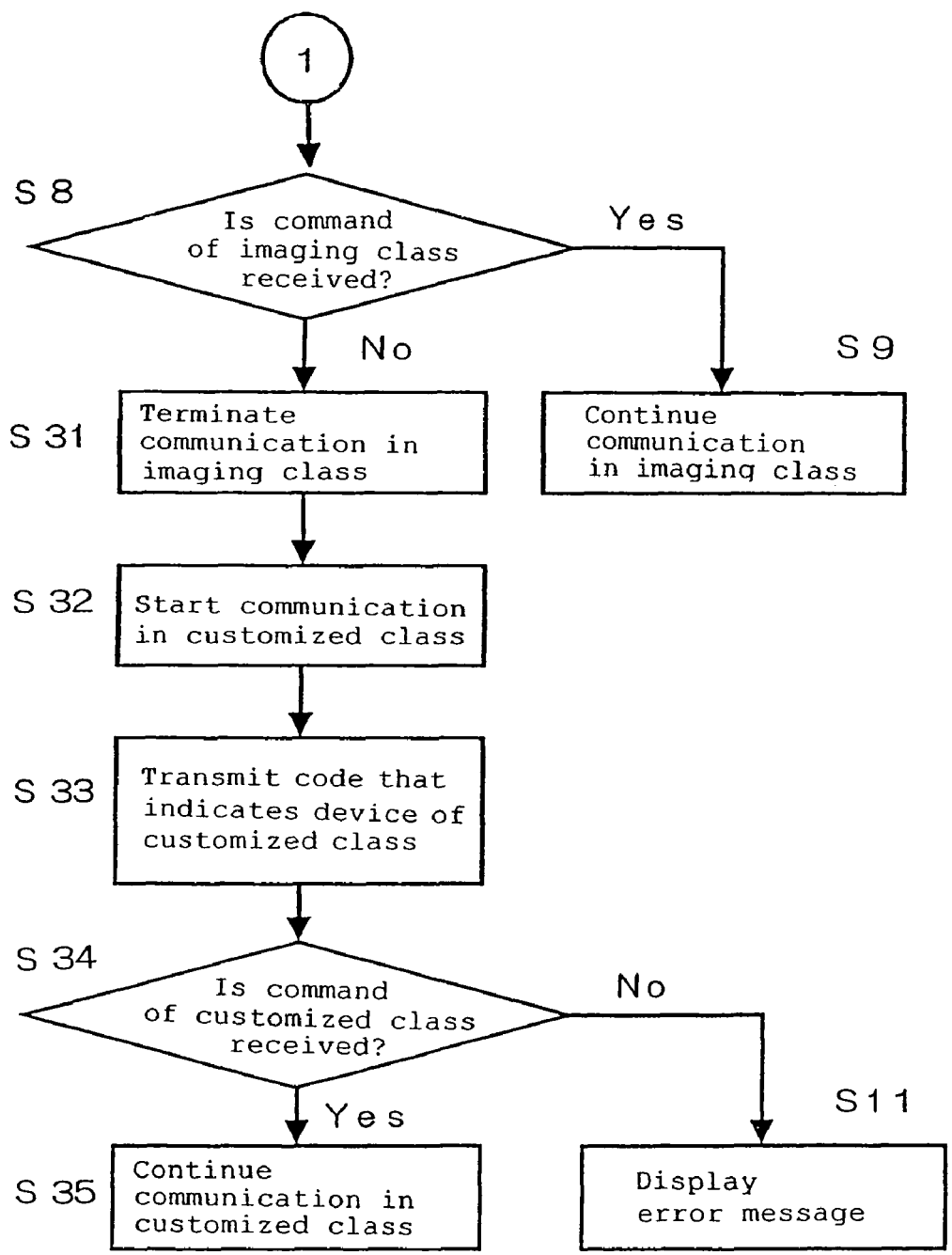
FIG. 9 is a diagram showing a flow chart of operation of a digital camera 110 according to Embodiment 1 of the present invention.

When three or more communication modes are included as described above, the above-mentioned switching of the communication mode from S5 to S6 is carried out such that the digital camera 110 should select a new communication mode different from the communication mode having been set up by the digital camera itself in S1-S4 from among the communication modes provided in the digital camera. The flow charts of FIGS. 8 and 9 show an example where the external device 300 serves as three devices each having any of communication modes of three kinds of classes consisting of the mass storage class, the imaging class, and the customized class, while the digital camera 110 also supports these three communication modes. However, in FIGS. 8 and 9, like steps to FIG. 4 are designated by like numerals, and detailed description of these steps is omitted.

In FIGS. 8 and 9, in case that the external device 300 is a device of mass storage class, communication is established in the flow of S1-S4 and S10. In the case that the external device 300 is a device of imaging class, communication is established in the flow of S1-S9. These flows are the same as the corresponding steps of FIG. 4.

Figure 4:
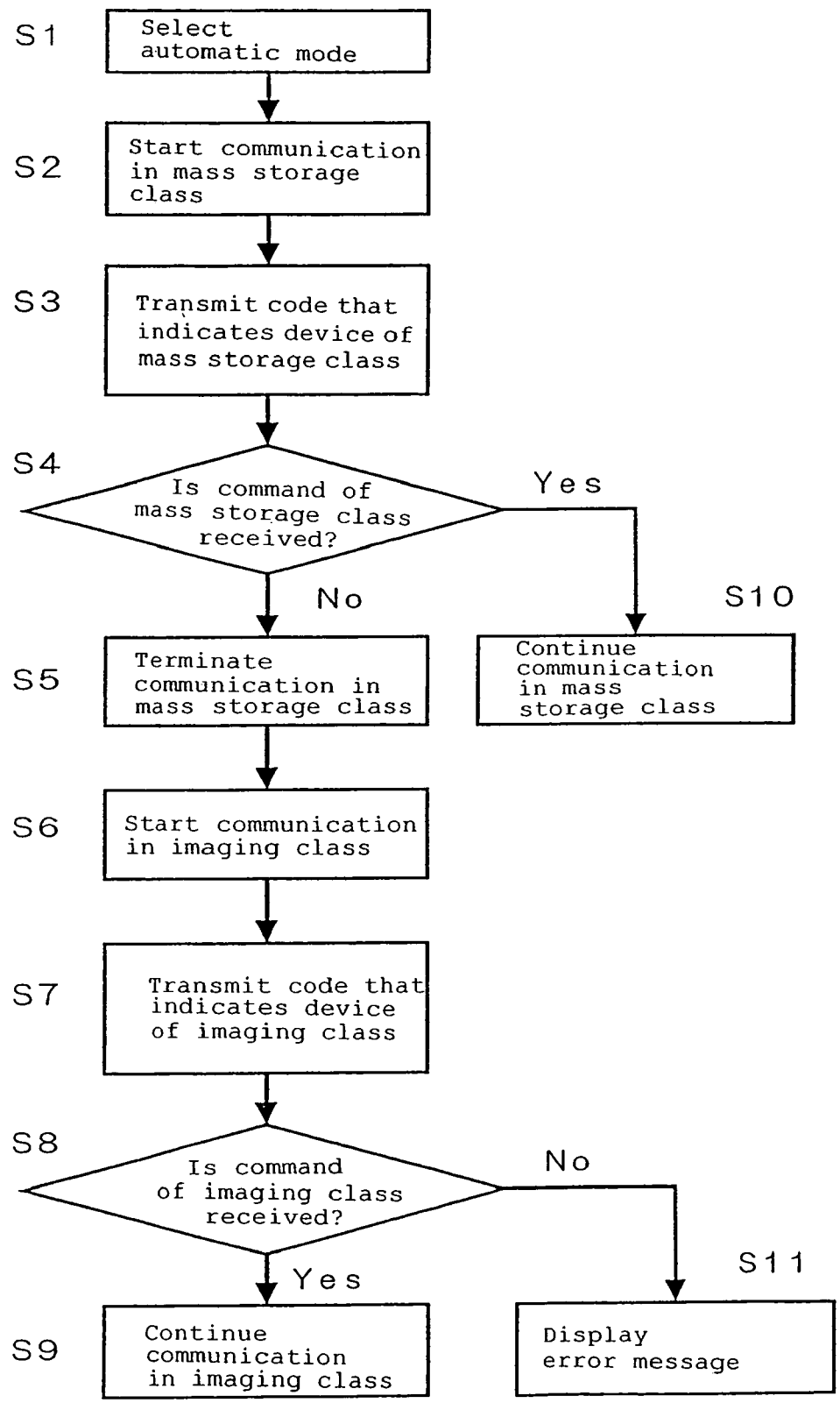
FIG. 4 is a diagram showing a flow chart of operation of a digital camera 110 according to Embodiment 1 of the present invention.
Figure 5:
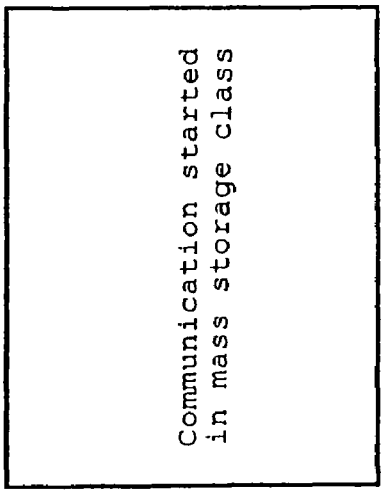
FIG. 5(a) is a schematic operation diagram of a liquid crystal display monitor 114 of a digital camera 110 according to Embodiment 1 of the present invention.
FIG. 5(b) is a schematic operation diagram of a liquid crystal display monitor 114 of a digital camera 110 according to Embodiment 1 of the present invention.
FIG. 5(c) is a schematic operation diagram of a liquid crystal display monitor 114 of a digital camera 110 according to Embodiment 1 of the present invention.
FIG. 5(d) is a schematic operation diagram of a liquid crystal display monitor 114 of a digital camera 110 according to Embodiment 1 of the present invention.
FIG. 5(e) is a schematic operation diagram of a liquid crystal display monitor 114 of a digital camera 110 according to Embodiment 1 of the present invention.
Figure 5:
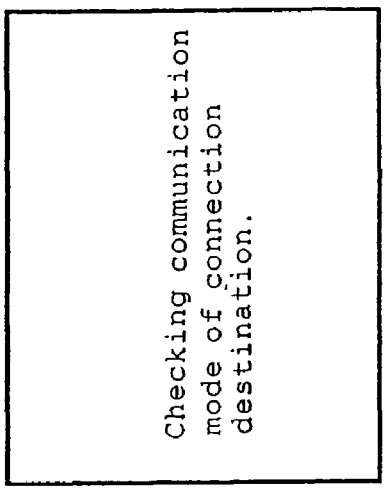
Figure 5:
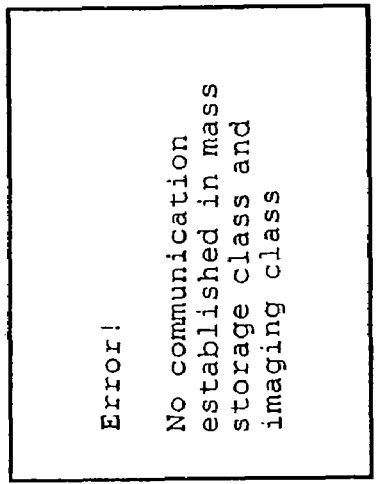
Figure 5:
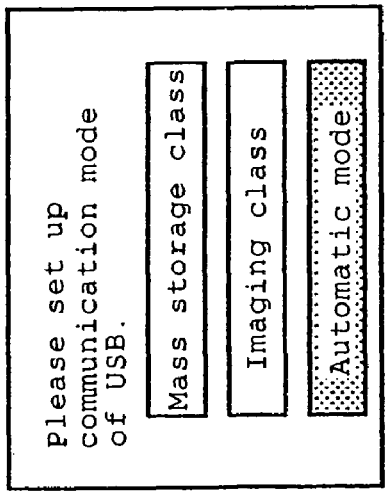
Figure 5:
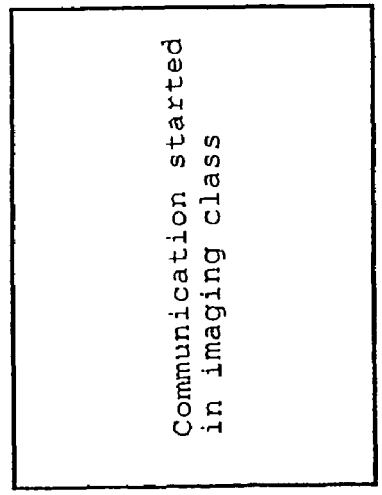

On the other hand, in case that the external device 300 is a device of customized class, the digital camera 110 cannot receive a command of imaging class in S8 of FIG. 9, because of the same reasons as (a) and (b) described in S4 of FIG. 4. Thus, the USB control section 118 pulls down the voltage of the D$^+$ line in the USB cable shown in FIG. 2, and thereby temporarily releases the electric connection between the digital camera 110 and the external device 300 so as to terminate the communication in the imaging class (S31).

Then, the USB control section 118 pulls up again the voltage of the D$^+$ line 220 in the USB cable 200, and thereby resumes the negotiation (S32). At that time, the USB control section switches the communication mode in the same timing as S5-S6 described above, and then transmits to the external device 300 a new communication code of notifying that the digital camera 110 itself is a device of customized class (S33).

Then, in response to this new communication code, the external device 300 transmits a command of customized class. The digital camera 110 receives this command (Yes in S34), and then continues the communication in the customized class (S35). When no command can be received, the user is notified through the liquid crystal display monitor 114 that communication can not be established between the devices (S11). Such a situation can occur when the USB cable 200 is not appropriately inserted into the communication connector 117 or the like so that physical connection is not secured. Alternatively, it is also possible that the external device 300 is a device of a class of communication mode different from the above-mentioned three communication modes.

In case that the digital camera 110 has a communication mode of the class other than the above-mentioned three classes, after terminating the communication of customized class, the digital camera resumes the communication in the communication mode so as to try to establish communication. The communication is established when the external device 300 is a device of the tried class. Otherwise, an error message is displayed finally.

In the above-mentioned operation, between S2 and S10, S9, or S11, the digital camera 110 may be in a state that no user operation is accepted regardless of the user's attempt. In this duration, a screen shown in FIG. 5(b) is displayed on the liquid crystal display monitor 114 so as to notify the user that a connection process is on-going.

Embodiment 2

Described below is the operation of a digital camera according to Embodiment 2 of the present invention. The configuration is the same as that of Embodiment 1. Thus, description is given with reference to FIGS. 1-2, while detailed description is omitted for like parts to Embodiment 1.

A digital camera of the present embodiment differs from that of Embodiment 1 in the point that the USB control section 118 can distinguish the kind of the communication mode of the external device 300 connected through the USB cable 200. The system controlling means 115 and the USB control section 118 correspond to communication mode identifying means and communication controlling means respectively of the present invention.

Figure 6:
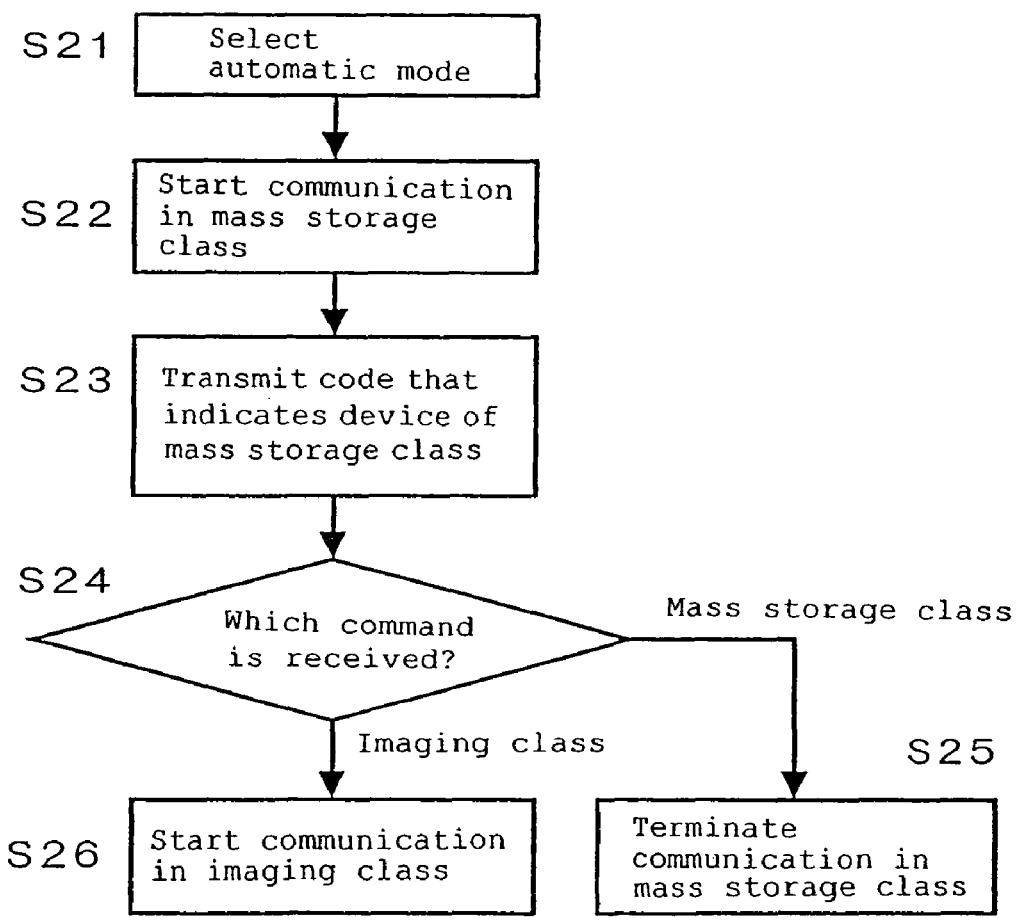
FIG. 6 is a diagram showing a flow chart of operation of a digital camera 110 according to Embodiment 2 of the present invention.
Figure 7:
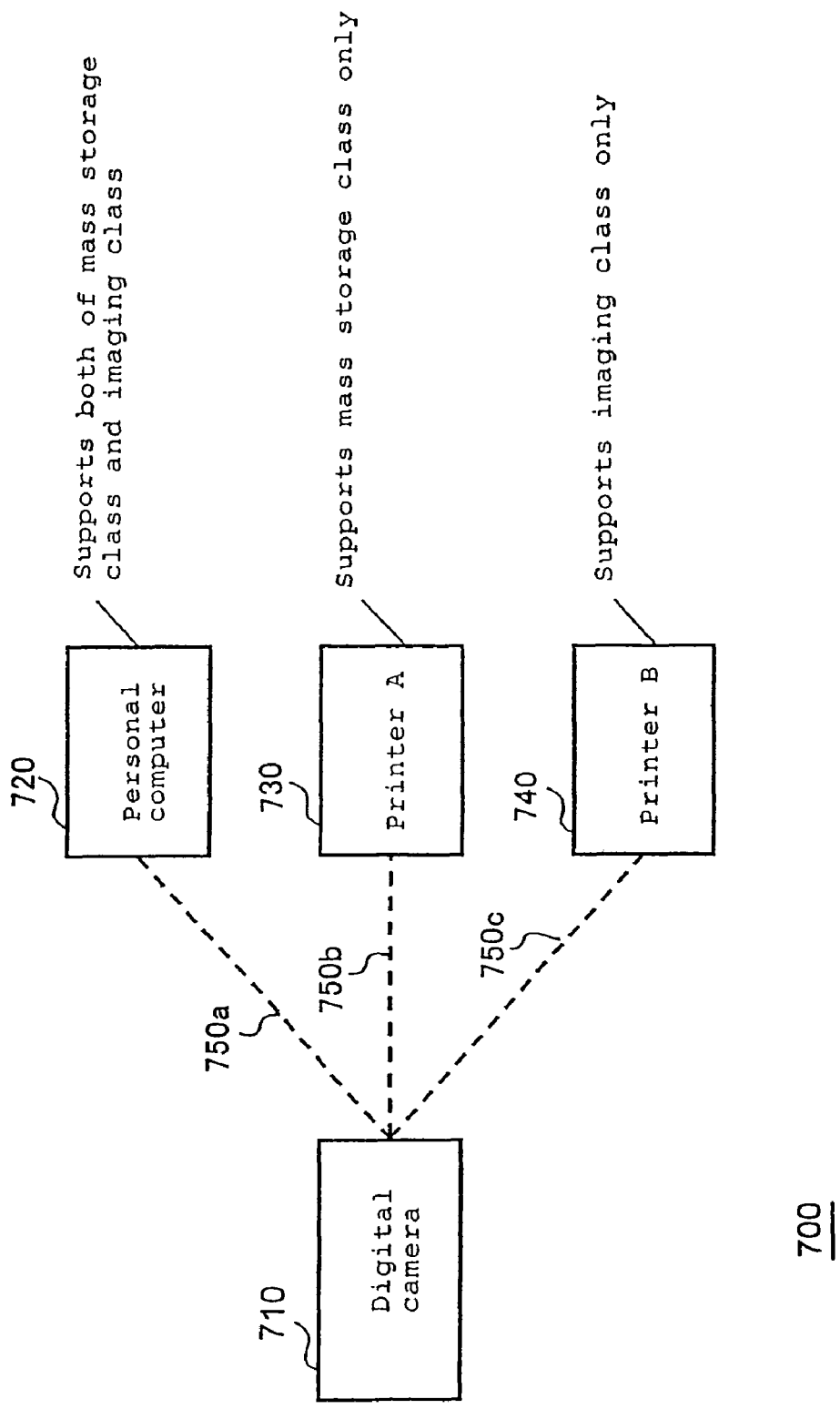
FIG. 7 is a configuration diagram of an image transfer system comprising a digital camera 710 and external devices according to the prior art.

Description is given below with reference to the flow chart of FIG. 6.

A user physically connects the digital camera 110 and the external device 300 through the USB cable 200 connected between their communication connectors. Then, referring to the selection screen on the liquid crystal display monitor 114 shown in FIG. 5(a), the user selects an automatic mode (S21).

Once the automatic mode is selected, negotiation for performing communication in the mass storage class starts between the digital camera 110 and the external device 300 (S22). Specifically, the USB control section 118 pulls up the voltage of the D$^+$ line in the USB cable shown in FIG. 2, so as to electrically connect the digital camera 110 to the external device 300.

Then, the external device 300 transmits to the digital camera 110 a command (standard request) for starting negotiation. The digital camera 110 transmits a notification code of notifying that the digital camera 110 itself is a mass storage device in response to the standard request (S23).

In response to this notification code, the external device 300 transmits a command of mass storage class when the external device 300 is a device of mass storage class like the personal computer 720 or the printer A 730. When the external device is a device of imaging class like the printer B 740, the external device transmits a command of imaging class. The digital camera 110 receives such a command.

In the digital camera 110, the USB control section 118 judges whether the presently received command is of the communication mode of mass storage class or of the communication mode of imaging class (S24). Similarly to the operation of checking the command in Embodiment 1, the judgment is carried out by referring to a packet of the command in each class. More specifically, a configuration such as a packet size and a head part is referred to. For example, a packet of mass storage class (in the case of Bulk-Only Transfer) has a size of 31 bytes, and has an identifier "USBC" in the head part. In contrast, a packet of imaging class (in the case of PTP: Picture Transfer Protocol) has a variable size, while its head part stores packet size information.

When the command is of mass storage class, the USB control section 118 continues the communication intact (S25). When the command is of imaging class, the USB control section changes its self-set communication mode into that of imaging class, and continues the communication (S26) so as to establish communication between the digital camera 110 and the external devices 300.

Thus, according to the present embodiment, the communication mode of the external device 300 can be distinguished immediately, so that communication can be established.

In the above-mentioned description, the external device 300 has been capable of transmitting a command of imaging class regardless of the kind of the communication code from the digital camera 110. However, in case that the external device is a device of a kind not capable of transmitting a corresponding command, it is sufficient to switch the communication mode automatically after a predetermined time duration similarly to Embodiment 1.

In the configuration of each embodiment described above, the connection between the digital camera 110 and the external device 300 has been established through the wire USB cable 200. However, the present invention is not limited to this. For example, the configurations may employ wireless communication (such as a wireless USB). Further, a telecommunication standard other than the USB may be used as long as it has a plurality of communication modes.

In each embodiment described above, a slave device of the present invention has been built in a digital camera. However, the slave device of the present invention may be embodied as an information processing device of the present invention built in another apparatus capable of communicating with a host device. Such an information processing device may be a removable-media carrying device such as a PDA, a portable phone, a hand-held computer, an external hard disk drive, a hard disk recorder, and a DVD recorder.

A program according to the present invention may be a program which causes a computer to perform the function of all or a part of the means (or apparatuses, elements, circuits, sections, or the like) of the slave device of the present invention described above, and which cooperates with the computer.

The present invention may be a medium which carries a program of causing a computer to perform the function of all or a part of the means of the slave device of the present invention described above and which can be read out by a computer, wherein said read-out program cooperates with said computer so as to perform said function.

The above-mentioned phrase "a part of the means" of the present invention indicates: a piece or pieces of means among plural pieces of the means; or a part of functions of a piece of means.

A part of the apparatuses of the present invention indicates: an apparatus or apparatuses among a plurality of the apparatuses; a part of means of an apparatus; or a part of functions of a piece of means.

A computer-readable recording medium carrying a program of the present invention is also included within the scope of the present invention.

A manner of usage of a program of the present invention may be that the program is recorded on a computer-readable recording medium and cooperates with a computer.

A manner of usage of a program of the present invention may be that the program is transmitted inside a transmission media, read out by a computer, and cooperates with the computer.

Data structures according to the present invention include a database, a data format, a data table, a data list, and the kind of data.

Recording media include a ROM. Transmission media include a transmission mechanism such as the Internet, as well as light, radio waves, and acoustic waves.

A computer of the present invention described above is not limited to genuine hardware such as a CPU, and may be firmware, an OS, and a peripheral device.

As described above, the configuration of the present invention may be embodied by software or hardware.

As such, the present invention provides a slave apparatus, a communication setting method, and the like applicable to a digital camera or the like and capable of setting up the communication mode automatically in correspondence to the type of an external device to be connected.

The invention claimed is:

1. A slave apparatus capable of communicating with a master device through a predetermined communication bus and having a plurality of communication modes of diverse kinds, said slave apparatus comprising:
    a communication controlling unit operable to select a communication mode from the plurality of communication modes, the plurality of communication modes include at least two modes selected from a mode corresponding to an imaging class, a mode corresponding to a mass storage class, a mode corresponding to a customized class, and a mode corresponding to a streaming class; and
    a judging unit operable to transmit to said master device a notification code for notifying the communication mode presently selected by said communication controlling unit, and then judge whether a command in response to said notification code is received from said master device within a predetermined time or not, wherein:
    said communication controlling unit performs control on the basis of a judgment result of said judging unit in such a manner that (1) when the command in response to said notification code is received from said master device within the predetermined time, a state permitting communication with said master device is determined based on the received command, and that (2) when said command is not received within said predetermined time, said communication controlling unit electrically releases connection to said master device temporarily and then restores the connection; and
    by the time when said slave apparatus and said master device resume communication as a result of said restoration of connection, said communication controlling unit selects a communication mode from the plurality of communication modes so that its presently set-up communication mode is changed to a different communication mode from that used immediately before said release.

2. A slave apparatus capable of communicating with a master device through a predetermined communication bus and having a plurality of communication modes of diverse kinds, said slave apparatus comprising:
    a communication controlling unit operable to select a communication mode from the plurality of communication modes, the plurality of communication modes include at least two modes selected from a mode corresponding to an imaging class, a mode corresponding to a mass storage class, a mode corresponding to a customized class, and a mode corresponding to a streaming class; and
    a judging unit operable to transmit to said master device a notification code for notifying the communication mode presently selected by said communication controlling unit, and then judge whether a command received from said master device in response to said notification code corresponds to said presently selected communication mode or not, wherein:

said communication controlling unit performs control on the basis of a judgment result of said judging unit in such a manner that (1) when said command corresponds to the presently selected communication mode, a state permitting communication with said master device is determined based on the received command, and that (2) when said command does not correspond to the presently selected communication mode, said communication controlling unit electrically releases connection to said master device temporarily and then restores the connection ; and by the time when said slave apparatus and said master device resume communication as a result of said restoration of connection, said communication controlling unit selects a communication mode from the plurality of communication modes so that its presently set-up communication mode is changed to a different communication mode from that used immediately before said release.

3. A slave apparatus capable of communicating with a master device through a predetermined communication bus and having a plurality of communication modes of diverse kinds, said slave apparatus comprising:

a communication controlling unit operable to select a communication mode from the plurality of communication modes, the plurality of communication modes include at least two modes selected from a mode corresponding to an imaging class, a mode corresponding to a mass storage class, a mode corresponding to a customized class, and a mode corresponding to a streaming class; and a communication mode identifying unit operable to transmit to said master device a notification code for notifying the communication mode presently selected by said a communication controlling unit, and then identify the kind of communication mode corresponding to a command received from said master device in response to said notification code, wherein:

said communication controlling unit performs control such as to change its own communication mode in correspondence to an identification result of said communication mode identifying unit and then establish a state permitting communication with said master device.

4. The slave apparatus according to claim 1, 2 or 3, wherein said predetermined communication bus is a universal serial bus ("USB") type.

5. The slave apparatus according to claim 4, wherein said communication controlling unit performs said release by pulling up or pulling down a voltage applied to a D$^+$or a D$^-$line of said USB.

6. The slave apparatus according to claim 4, wherein said communication controlling unit performs said release by turning OFF a $V_{bus}$ line through which a voltage from said hose device is supplied in said USB.

7. The slave apparatus according to claims 1, 2 or 3, wherein said mode corresponding to a mass storage class among the plurality of communication modes is set up as an initial state.

8. The slave apparatus according to claim 4, wherein said USB is embodied as a wire USB cable.

9. The slave apparatus according to claim 4, wherein said USB is embodied as a wireless circuit.

10. The slave apparatus according to claim 1, 2 or 3, comprising a displaying unit operable to display information on a communication state including information concerning a communication mode presently set up.

11. A digital camera comprising a slave apparatus according to claim 1, 2 or 3, and capable of transmitting recorded-by-oneself data recorded by itself to said master device through said communication bus.

12. A communication setting method of setting a communication mode in a slave device capable of communicating with a master device through a predetermined communication bus and having a plurality of communication modes of diverse kinds, said method comprising:

performing communication control by using the slave device to select a communication mode from the plurality of communication modes, the plurality of communication modes include at least two modes selected from a mode corresponding to an imaging class, a mode corresponding to a mass storage class, a mode corresponding to a customized class, and a mode corresponding to a streaming class;

transmitting to said master device a notification code for notifying the communication mode presently selected in said slave device, and then judging whether a command in response to said notification code is received from said master device within a predetermined time or not, wherein said performing communication control is performed on the basis of a judgment result of said judging in such a manner that (1) when the command in response to said notification code is received from said master device within the predetermined time, said slave device is set to a state permitting communication with said master device based on the received command, and that (2) when said command is not received within said predetermined time, said slave device electrically releases connection to said master device temporarily and then restores the connection; and in said performing communication control, by the time when said slave device and said master device resume communication as a result of said restoration of connection, a communication mode is selected from the plurality of communication modes so that a presently set-up communication mode of said slave device is changed to a different communication mode from that used immediately before said release.

13. A communication setting method of setting a communication mode in a slave apparatus capable of communicating with a master device through a predetermined communication bus and having a plurality of communication modes of diverse kinds, said method comprising:

performing communication control by using the slave apparatus to select a communication mode from the plurality of communication modes, the plurality of communication modes include at least two modes selected from a mode corresponding to an imaging class, a mode corresponding to a mass storage class, a mode corresponding to a customized class, and a mode corresponding to a streaming class;

transmitting to said master device a notification code for notifying the communication mode presently selected in said slave apparatus, and then judging whether a command received from said master device in response to said notification code corresponds to said communication mode presently selected in said slave apparatus or not, wherein:

said performing communication control is performed on the basis of a judgment result of said judging in such a manner than (1) when said command corresponds to the communication mode presently selected in said slave apparatus, a state permitting communication between said slave apparatus and said master device is determined based on the received command, and that (2) when said command does not correspond to the communication mode presently selected in said slave apparatus, said slave apparatus electrically releases connection to said master device temporarily and then restores the connection; and in said performing communication control, by the time when said slave apparatus and said master device resume communication as a result of said restoration of connection, a communication mode is selected from the plurality of communication modes so that a presently set-up communication mode of said slave apparatus is changed to a different communication mode from that used immediately before said release.

14. A communication setting method of setting a communication mode in a slave apparatus capable of communicating with a master device through a predetermined communication bus and having a plurality of communication modes of diverse kinds, said method comprising:

performing communication control by using the slave apparatus to select a communication mode from the plurality of communication modes, the plurality of communication modes include at least two modes selected from a mode corresponding to an imaging class, a mode corresponding to a mass storage class, a mode corresponding to a customized class, and a mode corresponding to a streaming class;

transmitting to said master device a notification code for notifying the communication mode presently selected in said slave apparatus, and then identifying the kind of communication mode corresponding to a command received from said master device in response to said notification code, wherein:

said performing communication control is performed to change the communication mode of said slave apparatus in correspondence to an identification result of said identifying and then establish a state permitting communication with said master device.

15. A computer readable recording medium including software that is adapted to control a computer to implement the method of claim 12.

16. A computer readable recording medium including software that is adapted to control a computer to implement the method of claim 13.

17. A computer readable recording medium including software that is adapted to control a computer to implement the method of claim 14.

18. An information processing apparatus comprising a slave apparatus according to claim 1, 2 or 3, and capable of communicating with said master device.

19. A digital camera capable of communicating with a master device through a predetermined communication bus and having a plurality of communication modes of diverse kinds, said digital camera comprising:

a communication control section operable to control a communication with said master device by selecting a communication mode from the plurality of communication modes, wherein said communication control section performs said control in such a manner that said communication control section transmits to said master device a notification code for notifying the communication mode presently selected by said communication control section, and then (A) when a command in response to said notification code is received from said master device within the predetermined time, a state permitting communication with said master device is determined based on the received command, and (B) when said command is not received from said master device within said predetermined time, connection to said master device is electrically released temporarily and then said connection is restored, and by the time when said slave apparatus and said master device resume communication as a result of said restoration of connection, said communication control section selects a communication mode from the plurality of communication modes so that its presently set-up communication mode is changed to a different communication mode from that used immediately before said release.

* * * * *

UNITED STATES PATENT AND TRADEMARK OFFICE
CERTIFICATE OF CORRECTION

PATENT NO. : 7,760,232 B2  Page 1 of 1
APPLICATION NO. : 10/533765
DATED : July 20, 2010
INVENTOR(S) : Toru Takashima It is certified that error appears in the above-identified patent and that said Letters Patent is hereby corrected as shown below:

On the Title Page, FIELD [54], Col. 1, Title: "SLAVE DEVICE AND COMMUNICATION SETTING METHOD" should read --SLAVE APPARATUS AND COMMUNICATION SETTING METHOD--

Signed and Sealed this

Twenty-first Day of December, 2010

David J. Kappos
*Director of the United States Patent and Trademark Office*